(12) United States Patent
Fattal et al.

(10) Patent No.: US 10,678,094 B2
(45) Date of Patent: Jun. 9, 2020

(54) POLARIZED BACKLIGHT AND BACKLIT DISPLAY USING THE SAME

(71) Applicant: LEIA INC., Menlo Park, CA (US)

(72) Inventors: David A. Fattal, Mountain View, CA (US); Ming Ma, Palo Alto, CA (US); Xuejian Li, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/338,443

(22) PCT Filed: Oct. 4, 2017

(86) PCT No.: PCT/US2017/055212
§ 371 (c)(1),
(2) Date: Mar. 29, 2019

(87) PCT Pub. No.: WO2018/067752
PCT Pub. Date: Apr. 12, 2018

(65) Prior Publication Data
US 2019/0227363 A1    Jul. 25, 2019

Related U.S. Application Data

(60) Provisional application No. 62/404,750, filed on Oct. 5, 2016.

(51) Int. Cl.
*G02F 1/1335* (2006.01)
*F21V 8/00* (2006.01)
(Continued)

(52) U.S. Cl.
CPC ........... *G02F 1/13362* (2013.01); *G02B 6/00* (2013.01); *G02B 6/005* (2013.01); *G02B 6/0023* (2013.01);
(Continued)

(58) Field of Classification Search
CPC ... G02F 1/13362; G02B 6/005; G02B 6/0053; G02B 6/0056; G02B 6/0061; G02B 6/00; G02B 6/0023; G02B 6/0043
See application file for complete search history.

(56) References Cited

U.S. PATENT DOCUMENTS 5,359,691 A    10/1994   Tai et al.
6,130,730 A    10/2000   Jannson et al.
(Continued)

FOREIGN PATENT DOCUMENTS

WO    2012038856 A1    3/2012
WO    2016148689 A1    9/2016

OTHER PUBLICATIONS

International Search Report and Written Opinion (ISRWO) by International Searching Authority (ISA) Korean Intellectual Property Office (KIPO), dated Jan. 19, 2018 (13 pages) for counterpart PCT Application PCT/US2017/055212.
(Continued)

*Primary Examiner* — Thomas M Sember
(74) *Attorney, Agent, or Firm* — J. Michael Johnson

(57) ABSTRACT

A polarized backlight employs a light source configured to provide polarized light and a light guide to guide the polarized light. A polarization-preserving scattering feature optically coupled to the light guide is configured to scatter a portion of the guided polarized light out of the light guide as emitted polarized light. A polarization of the emitted polarized light is determined by a polarization of the guided polarized light.

23 Claims, 9 Drawing Sheets

(51) Int. Cl.
   *G02B 6/00* (2006.01)
   *G02F 1/13357* (2006.01)
(52) U.S. Cl.
   CPC ......... *G02B 6/0043* (2013.01); *G02B 6/0053* (2013.01); *G02B 6/0056* (2013.01); *G02B 6/0061* (2013.01); *G02F 1/133615* (2013.01)

(56) References Cited

U.S. PATENT DOCUMENTS

| | | | |
|---|---|---|---|
| 7,223,010 | B2 | 5/2007 | Min et al. |
| 8,251,563 | B2 | 8/2012 | Papakonstantinou et al. |
| 8,651,726 | B2 | 2/2014 | Robinson |
| 9,128,226 | B2 | 9/2015 | Fattal et al. |
| 9,201,270 | B2 | 12/2015 | Fattal et al. |
| 9,298,168 | B2 | 3/2016 | Taff et al. |
| 9,389,415 | B2 | 7/2016 | Fattal et al. |
| 9,459,461 | B2 | 10/2016 | Santori et al. |
| 9,557,466 | B2 | 1/2017 | Fattal |
| 9,785,119 | B2 | 10/2017 | Taff et al. |
| 2005/0041174 | A1 | 2/2005 | Numata et al. |
| 2006/0262376 | A1 | 11/2006 | Mather et al. |
| 2011/0141395 | A1 | 6/2011 | Yashiro |
| 2012/0008067 | A1 | 1/2012 | Mun et al. |
| 2014/0268867 | A1 | 9/2014 | Fiorentino et al. |
| 2015/0301261 | A1 | 10/2015 | Nevitt et al. |
| 2015/0355403 | A1 | 12/2015 | Santori et al. |
| 2016/0195664 | A1 | 7/2016 | Fattal et al. |
| 2017/0090096 | A1 | 3/2017 | Fattal |
| 2018/0299608 | A1 | 10/2018 | Fattal et al. |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al.,"Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

Z. Luo et al., Enhancing LCD Optical Efficiency with a Linearly Polarized Backlight and Polarization-preserving Light Guide Plate, SID 2014 Digest, pp. 836-838, 57.2.

POLARIZED BACKLIGHT AND BACKLIT DISPLAY USING THE SAME

CROSS-REFERENCE TO RELATED APPLICATIONS

This application is a U.S. national stage patent application filed under 35 U.S.C. § 371 and claims the benefit of priority to International Application No. PCT/US2017/055212, filed Oct. 4, 2017, which claims priority to U.S. Provisional Patent Application Ser. No. 62/404,750, filed Oct. 5, 2016, each of which is incorporated by reference herein in its entirety.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as active displays. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
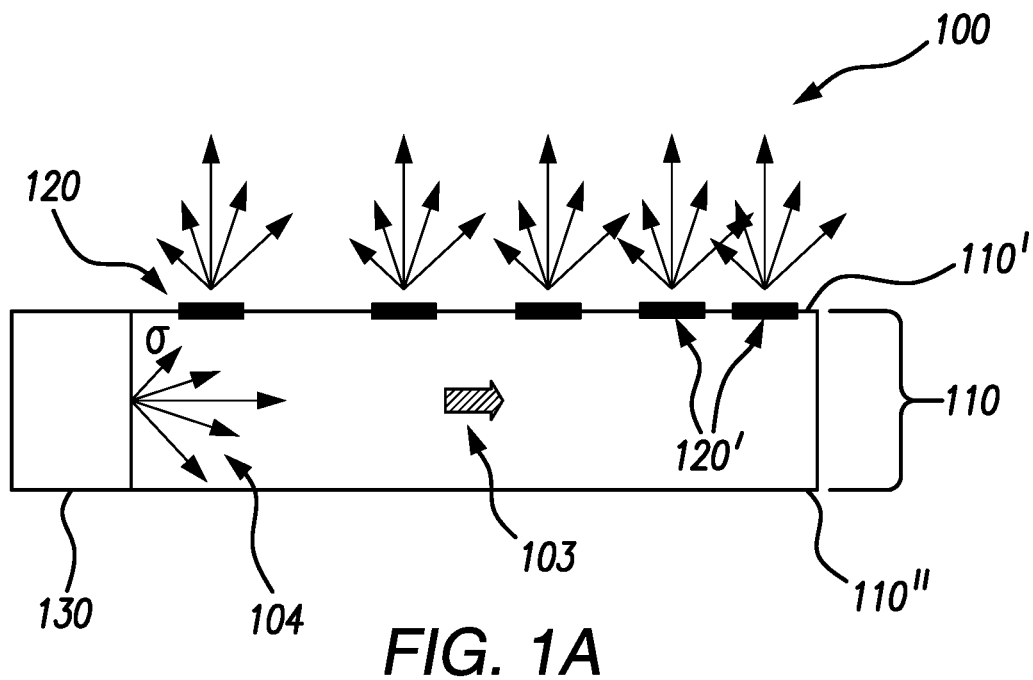
FIG. 1A illustrates a cross-sectional view of a polarized backlight in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide backlighting employing polarization-preserving scattering with application to electronic displays. In various embodiments consistent with the principles described herein, a polarized backlight employing a polarization-preserving scattering feature is provided. A light source is employed to provide polarized light to the polarized backlight. The polarization-preserving scattering feature is configured to provide emitted light that preserves or at least substantially preserves a polarization of light generated by the light source. In some embodiments, the emitted light is configured to match a polarization of a light valve array configured to modulate the emitted polarized light as modulated polarized light representing pixels of a display. This may obviate a need for a polarizing element such a polarizing film at either an input to the light valve array or an output of the polarized backlight, in some embodiments.

According to various embodiments, the polarization-preserving scattering feature includes a polarization-preserving scattering element that may comprise one or both of a diffractive grating and any of various microprism structures to scatter out guided polarized light as emitted polarized light. In particular, the polarization-preserving scattering feature may comprise a plurality of polarization-preserving scattering elements spaced apart from one another and having a density within the polarization-preserving scattering feature configured to control an intensity of the emitted light. The polarized backlight may further comprise a collimator configured to collimate light communicated to the light guide. The polarization-preserving scattering feature may further provide angle-preserving scattering in some embodiments. As such, the polarization-preserving scattering feature may also be an angle-preserving scattering feature configured to preserve a spread angle or 'collimation factor' of the polarized guided light in the emitted light. This may eliminate the need for a collimator element at the output of the polarized backlight, in some embodiments.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Herein, 'polarized light' is defined as light having a predetermined or predefined polarization. In some embodiments, the predetermined polarization is a linear polarization having selectively oriented polarization components. In particular, the polarized light may have a predetermined polarization comprising a first polarization component and a second polarization component. The first polarization component may be a transverse electric (TE) polarization component, while the second polarization component may be a transverse magnetic (TM) polarization component. In some embodiments, the TE component may be selectively oriented to be parallel to a surface of a light guide.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Herein, a 'polarization-preserving scattering feature' or equivalently a 'polarization-preserving scatterer' is defined as any feature or scatterer configured to scatter light in a manner that substantially preserves in scattered light a polarization or at least a degree of polarization of the light incident on the feature or scatterer. In some embodiments, light may comprise a polarized portion and an unpolarized portion. By definition, therefore, a degree of polarization of light is a measure of the polarization of light, and specifically, the fraction of light that is polarized. In some embodiments, the degree of polarization of light may be given by equation (1) as:

$$V = \frac{Ip}{Ip + In} \quad (1)$$

where V is the degree of polarization, Ip is an intensity of the polarized portion of the light, and In is an intensity of the unpolarized portion of the light. Accordingly, a 'polarization-preserving scattering feature' may be further defined as any feature or scatterer where a degree of polarization of a light incident on the feature or scatterer is substantially equal to the degree of polarization of the scattered light.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

Herein, a 'microprism structure' is generally defined as a structure comprising a microprism or a plurality of microprisms having an inclined sidewall(s) and configured to refractively scatter light incident on the microprism structure. If the light is incident on the microprism structure from a light guide, the microprism structure may be understood as a structure comprising a microprism or a plurality of microprisms configured to refractively couple out or scatter out light from the light guide. In some embodiments, the microprism structure can comprise a first microprism layer and a second microprism layer disposed adjacent to and separated by a gap from the first microprism layer. Herein therefore, a 'microprism layer' is defined as a plurality of microprisms disposed or arrayed in or on a material layer of film. In some embodiments, microprisms of the first and second microprism layers may have inclined sidewalls with complimentary slopes. The inclined sidewalls of the second microprism layer may be configured to reflect light at an interior surface of the sidewalls to provide emitted light. In some embodiments, the microprisms of the first and second microprism layers may include curved microprisms.

According to various embodiments, the microprism structure may comprise an inverted microprism element. By definition herein, an 'inverted microprism element' is a microprism having a truncated conical shape with an input aperture, an inclined sidewall, and an output aperture that is larger than the input aperture. In particular, the input aperture is configured to receive light and the inclined sidewall is configured to reflect the light received through the input aperture, whereas the output aperture is configured to emit the reflected light. Thus, the input aperture is a portion of the inverted microprism element comprising an optical connection between the inverted microprism element and the light guide, and configured to receive extracted or coupled-out light from the light guide. The inclined sidewall comprises an interior surface of the inverted microprism element that is configured to reflect light. In some embodiments, the inclined sidewall may comprise a reflective layer or reflective material (e.g., a reflective material layer on an exterior surface of the sidewall). The reflective layer may be configured to provide or enhance reflection at the interior surface of the inverted microprism element. The reflected light is emitted from the output aperture of the inverted microprism element.

Herein a 'collimator' is defined as substantially any optical device or apparatus that is configured to collimate light. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Further herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, 'angle-preserving scattering' is defined as scattering of light in a manner that substantially preserves in scattered light a collimation factor of incident light. That is, 'angle-preserving scattering' comprises scattering of light in a manner that substantially preserves an angular spread of light incident on a feature or scatterer. In particular, by definition, an angular spread $\sigma_s$ of light scattered by an angle-preserving scattering feature is a function of an angular spread $\sigma$ of the incident light (i.e., $\sigma_s = f(\sigma)$). In some embodiments, the angular spread $\sigma_s$ of the scattered light is a linear function of the angular spread or collimation factor $\sigma$ of the incident light (e.g., $\sigma_s = a \cdot \sigma$, where a is an integer). That is, the angular spread $\sigma_s$ of light scattered by an angle-preserving scattering feature may be substantially proportional to the angular spread or collimation factor $\sigma$ of the incident light. For example, the angular spread $\sigma_s$ of the scattered light may be substantially equal to the incident light angular spread $\sigma$ (e.g., $\sigma_s \approx \sigma$). A uniform diffraction grating (i.e., a diffraction grating having a substantially uniform or constant diffractive feature spacing or grating pitch) is an example of an angle-preserving scattering feature.

Further, as used herein, the article 'a' is intended to have its ordinary meaning in the patent arts, namely 'one or more'. For example, 'a polarization-preserving scattering feature' means one or more a polarization-preserving scattering features and as such, 'the polarization-preserving scattering feature' means 'polarization-preserving scattering feature(s)' herein. Also, any reference herein to 'top', 'bottom', 'upper', 'lower', 'up', 'down', 'front', 'back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 1B:
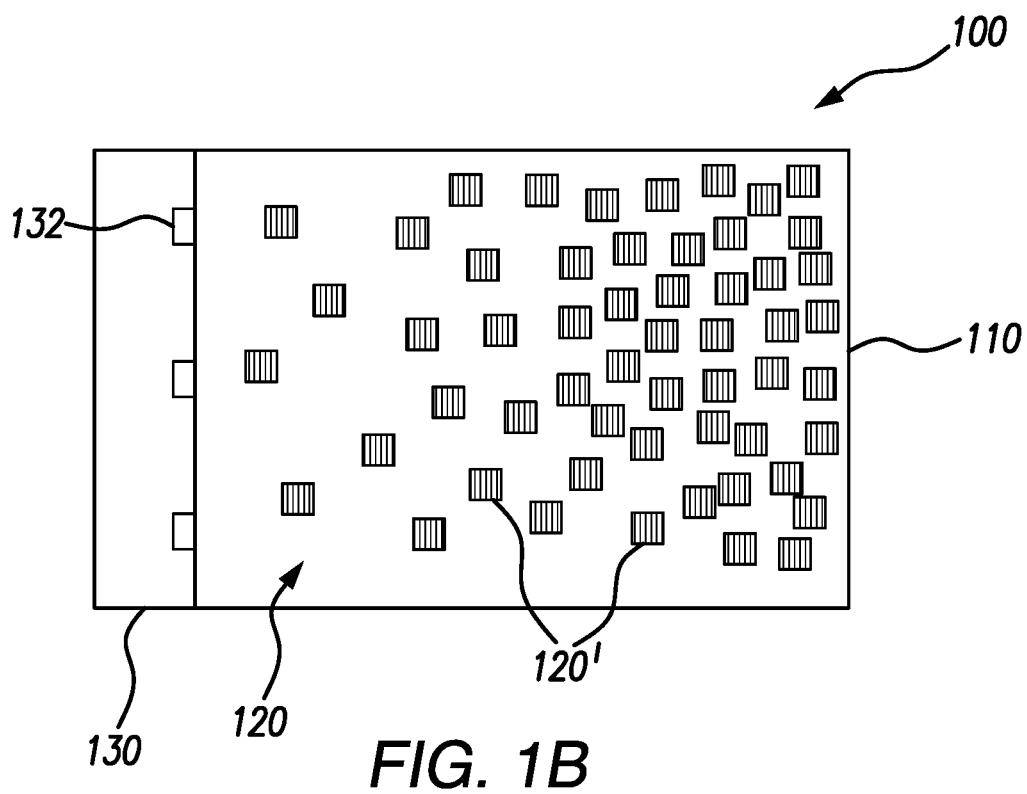
FIG. 1B illustrates a plan view of a polarized backlight in an example, according to an embodiment consistent with the principles described herein.
Figure 1C:
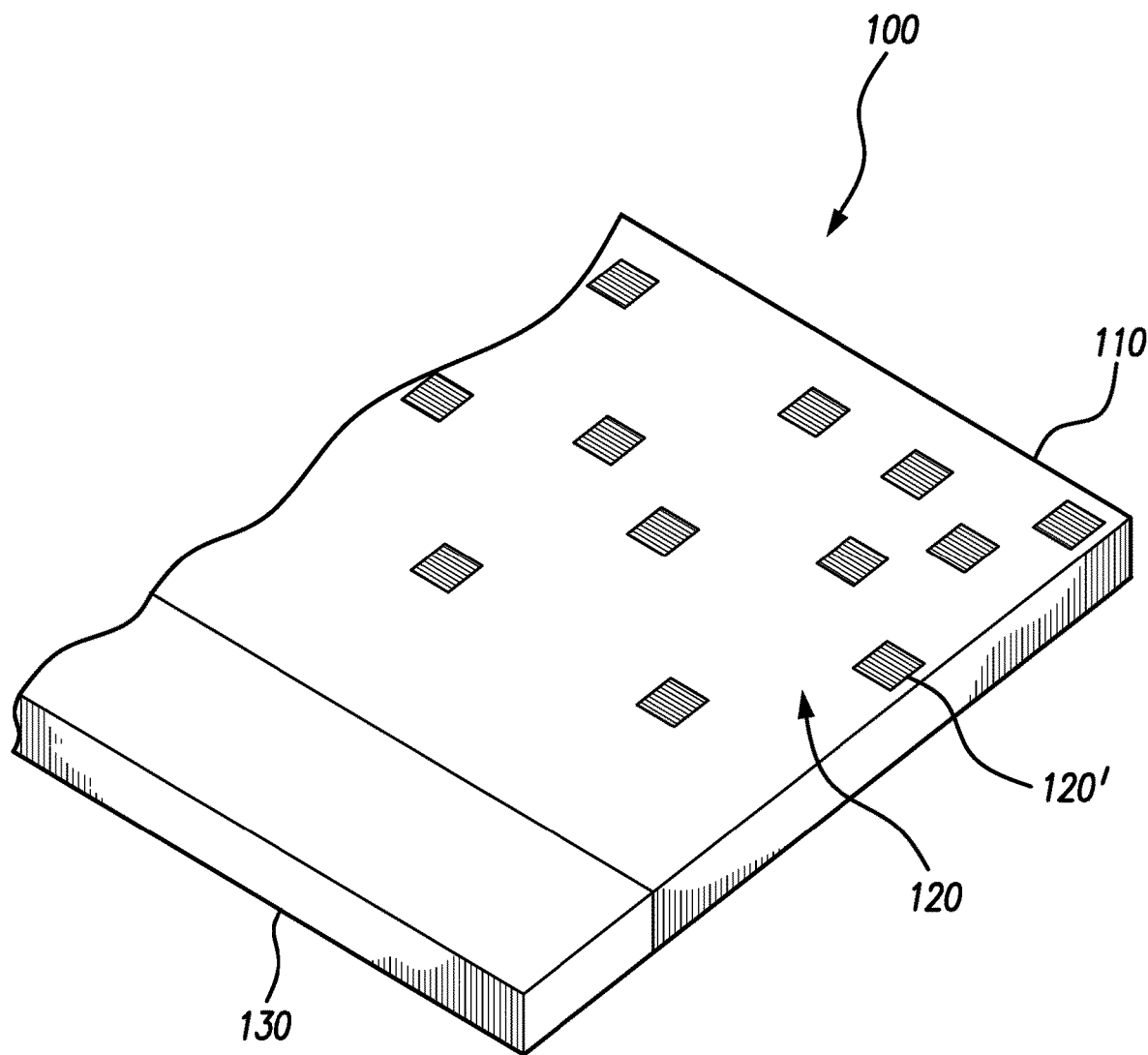
FIG. 1C illustrates a perspective view of a polarized backlight in an example, according to an embodiment consistent with the principles described herein.

According to some embodiments of the principles described herein, a polarized backlight is provided. FIG. 1A illustrates a cross-sectional view of a polarized backlight 100 in an example, according to an embodiment consistent with the principles described herein. FIG. 1B illustrates a plan view of a polarized backlight 100 in an example, according to an embodiment consistent with the principles described herein. FIG. 1C illustrates a perspective view of a polarized backlight 100 in an example, according to an embodiment consistent with the principles described herein. The illustrated polarized backlight 100 may be used for backlighting in an electronic display including, but not limited to, a backlit display, for example. According to various embodiments and as described below, the polarized backlight 100 may comprise a light guide 110, a polarization-preserving scattering feature 120, and a light source 130.

The polarized backlight 100 illustrated in FIGS. 1A-1C is configured to provide coupled-out or emitted light 102 having a predetermined polarization. As such, the emitted light 102 may be emitted polarized light, according to various embodiments. The emitted light 102 is directed away from a surface (e.g., a first surface 110' of the light guide 110) of the polarized backlight 100, as illustrated. The emitted light 102 may be employed to illuminate or serve as an illumination source for an electronic display. In particular, the emitted light 102 may be modulated (e.g., using light valves, as described below) to facilitate the display of information (e.g., images) by the electronic display, for example.

As illustrated in FIGS. 1A-1C, the polarized backlight 100 comprises a light source 130. According to various embodiments, the light source 130 is configured to provide polarized light to be guided within the light guide 110, as described below. In particular, the light source 130 may be located adjacent to an entrance surface or end (input end) of the light guide 110. In various embodiments, the light source 130 may comprise substantially any source of light (e.g., optical emitter) including, but not limited to, a light emitting diode (LED), a laser (e.g., laser diode) or a combination thereof. In some embodiments, the light source 130 may comprise an optical emitter 132 configured to produce a substantially monochromatic light having a narrowband spectrum denoted by a particular color. In particular, the color of the monochromatic light may be a primary color of a particular color space or color model (e.g., a red-green-blue (RGB) color model). In other examples, the light source 130 may be a substantially broadband light source configured to provide substantially broadband or polychromatic light. For example, the light source 130 may provide white light. In some embodiments, the light source 130 may comprise a plurality of different optical emitters configured to provide different colors of light. The different optical emitters 132 may be configured to provide light having different, color specific, non-zero propagation angles of the guided light corresponding to each of the different colors of light.

In embodiments noted above, the light source 130 is configured to emit polarized light. In some embodiments, the light source 130 may comprise an optical emitter 132 configured to produce polarized light. That is, the optical emitter 132 may be configured to emit light having a predetermined polarization. In some embodiments, the optical emitter 132 is configured to provide light comprising a transverse electric (TE) polarization component. In other embodiments, the optical emitter 132 is configured to provide light comprising a transverse magnetic (TM) polarization component. In some embodiments, the light source 130 may comprise an optical emitter 132 configured to emit unpolarized or non-polarized light. In these embodiments, the light source 130 may further comprise a polarizing element or polarizer (not shown) disposed between the optical emitter 132 and an output of the light source 130, the polarizing element configured to polarize the unpolarized or non-polarized light provided by the optical emitter 132 of the light source 130. For example, the polarizing element may be configured to receive unpolarized light and selectively transmit a portion of the received light in which transverse electric (TE) polarization component is selectively oriented. In this way, the light emitted by the light source 130 is polarized light regardless of embodiment.

As illustrated in FIGS. 1A-1C, the polarized backlight 100 further comprises a light guide 110. The light guide 110 may be a plate light guide, according to some embodiments. The light guide 110 is configured to guide light along a length of the light guide 110 as guided light 104. In particular, the light guide 110 is configured to guide the polarized light provided by the light source 130 as a guided 'polarized' light 104. For example, the light guide 110 may include a dielectric material configured as an optical waveguide. The dielectric material of the optical waveguide may have a first refractive index that is greater than a second refractive index of a medium surrounding the dielectric optical waveguide. The difference in refractive indices is configured to facilitate total internal reflection of the guided polarized light 104 according to one or more guided modes of the light guide 110. In FIG. 1A, a general propagation direction 103 of the guided polarized light 104 is indicated by bold arrows.

In some embodiments, the dielectric optical waveguide of the light guide 110 may be a slab or plate optical waveguide comprising an extended, substantially planar sheet of optically transparent, dielectric material. According to various examples, the optically transparent, dielectric material of the light guide 110 may include or be made up of any of a variety of dielectric materials including, but not limited to, one or more of various types of glass (e.g., silica glass, alkali-aluminosilicate glass, borosilicate glass, etc.), one or more substantially optically transparent plastics or polymers (e.g., poly(methyl methacrylate) or 'acrylic glass', polycarbonate, etc.) or a combination thereof. In some embodiments, the light guide 110 may further include a cladding layer (not illustrated) on at least a portion of a surface (e.g., one or both of a top surface and a bottom surface) of the light guide 110. The cladding layer may be used to further facilitate total internal reflection, according to some examples.

According to some embodiments, the light guide 110 is configured to guide the guided polarized light 104 according to total internal reflection at a non-zero propagation angle between a first surface 110' (e.g., 'front' surface or side) and a second surface 110" (e.g., 'back' surface or side) of the light guide 110. In particular, the guided polarized light 104 may propagate by reflecting or 'bouncing' between the first surface 110' and the second surface 110" of the light guide 110 at the non-zero propagation angle (albeit in the propagation direction 103 indicated by the bold arrows).

As defined herein, a 'non-zero propagation angle' is an angle relative to a surface (e.g., the first surface 110' or the second surface 110") of the light guide 110. Further, the non-zero propagation angle is both greater than zero and less than a critical angle of total internal reflection within the light guide 110, according to various embodiments. For example, the non-zero propagation angle of the guided polarized light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 110.

In some embodiments, the guided polarized light 104 may be collimated or equivalently may be a collimated light beam (e.g., provided by a collimator 140, described below). Herein, a 'collimated light' or 'collimated light beam' is generally defined as a beam of light in which rays of the light beam are substantially confined to a predetermined or defined angular spread within the light beam (e.g., the guided polarized light 104). Further, rays of light that diverge or are scattered from the collimated light beam are not considered to be part of the collimated light beam, by definition herein. Moreover, the guided polarized light 104 may be collimated according to or having a collimation factor σ, in various embodiments.

In some embodiments, the light guide 110 may be configured to 'recycle' the guided polarized light 104. In particular, the guided polarized light 104 that has been guided along the light guide length may be redirected back along that length in another propagation direction that differs from (e.g., is opposite to) the propagation direction 103. For example, the light guide 110 may include a reflector (not illustrated) at an end of the light guide 110 opposite to an input end or entrance edge adjacent to the light source. The reflector may be configured to reflect the guided polarized light 104 back toward the entrance edge as recycled guided light. Alternatively (e.g., as opposed to recycling guided light), guided polarized light 104 propagating in the other propagation direction may be provided by introducing light into the light guide 110 with the other propagation direction (e.g., in addition to guided polarized light 104 having the propagation direction 103). Recycling guided polarized light 104 or alternatively providing guided polarized light 104 in the other propagation direction may increase a brightness of the polarized backlight 100 (e.g., an intensity of the light beams of the emitted light 102) by making guided light available to be scattered out of the polarized backlight 100 more than once, for example, e.g., by polarization preserving scatterers and angle-preserving scatterers described below.

According to various embodiments, the light guide 110 has a polarization-preserving scattering feature 120. The polarization-preserving scattering feature 120 is configured to scatter a portion of the guided polarized light 104 out of the light guide 110 as the emitted light 102. In some embodiments (e.g., as illustrated), the polarization-preserving scattering feature 120 comprises a plurality of polarization-preserving scatterers. In particular, individual polarization-preserving scatterers of the polarization-preserving scattering feature 120 may be discrete structures, elements or features that are spaced apart from one another, each discrete structure being configured to scatter or couple-out a different portion of the guided polarized light 104 in a polarization-preserving manner. In various embodiments, the polarization-preserving scattering feature 120 may comprise any of a variety of different structures or features that provide or are configured to produce polarization-preserving scattering including, but not limited to, a diffraction grating, a reflective structure, and a refractive structure (e.g., a microprism structure, as described below) as well as various combinations thereof. Further, the polarization-preserving scattering feature 120 may also provide angle-preserving scattering and thus may comprise an angle-preserving scatterer or also be an angle-preserving scattering feature, according to various embodiments.

Referring to FIGS. 1A-1C, the polarization-preserving scattering feature 120 may comprise a plurality of polarization-preserving scattering elements 120' spaced apart from one another one or both of across a width and along a length of the light guide. In particular, the polarization-preserving scattering elements 120' may be separated from one another by a finite space and represent individual, distinct elements along the light guide length. That is, by definition herein, polarization-preserving scattering elements 120' are spaced apart from one another according to a finite (i.e., non-zero) inter-element distance (e.g., a finite center-to-center distance). Further, the polarization-preserving scattering elements 120' generally do not intersect, overlap or otherwise touch one another, according to some embodiments. That is, each polarization-preserving scattering element 120' of the plurality is generally distinct and separated from other ones of the polarization-preserving scattering elements 120'.

In various embodiments, the plurality of polarization-preserving scattering elements 120' may be arranged in a variety of configurations that are one or more of at, on and in the surface (e.g., the first surface 110' or the second surface 110") of the light guide 110. For example, polarization-preserving scattering elements 120' may be arranged in columns and rows across the light guide surface (e.g., as an array). In another example, a plurality of polarization-preserving scattering elements 120' may be arranged in groups and the groups may be arranged in rows and columns. In yet another example, illustrated in FIGS. 1B-1C, the plurality of polarization-preserving scattering elements 120' may be distributed substantially randomly across the surface of the light guide 110.

According to some embodiments, the polarization-preserving scattering elements 120' of the plurality may be arranged in either a one-dimensional (1D) array or a two-dimensional (2D) array. For example, the polarization-preserving scattering elements 120' may be arranged as a linear 1D array. In another example, the polarization-preserving scattering elements 120' may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the polarization-preserving scattering elements 120' may be substantially uniform or constant across the array. In other examples, the inter-element distance between the polarization-preserving scattering elements 120' may be varied one or both of across the array and along the length of the light guide 110.

In some embodiments, a spatial density of polarization-preserving scattering elements within the plurality of polarization-preserving scattering elements 120' is configured to control an intensity of the emitted light 102, as illustrated in FIG. 1B. In particular, the spatial density may be a function of distance from the light source 130. That is, an inter-element distance (e.g., center-to-center distance or spacing) between the polarization-preserving scattering elements 120' may be varied or modulated across a length or a width of the light guide 110 or both as a function of distance from the light source 130. In some embodiments, the spatial density grows with the distance from the light source 130. That is, the inter-element distance between polarization-preserving scattering elements 120' diminishes with distance from the light source 130. Accordingly, polarization-preserving scattering elements 120' are spaced further apart near the light source 130, and spaced closer together when further from the light source 130. The spatial density of polarization-preserving scattering elements 120' may vary with distance from the light source 130 according to a variety of patterns. In some embodiments, the spatial density may be varied linearly with the distance from the light source 130. In other embodiments, the spatial density may be varied non-linearly with the distance from the light source 130. For example, the variation of the spatial density based on the polarization-preserving scattering element's distance from the light source 130 may be exponential, logarithmic, or other substantially non-uniform or random but still monotonic manner. Non-monotonic density variations such as, but not limited to, a sinusoidal variation or a triangular or sawtooth variation, may also be employed, as well as combinations of any of these variations.

Further, an intensity of the emitted polarized light increases with the spatial density of polarization-preserving scattering elements 120'. The increased intensity may reflect a coupling efficiency of the polarization-preserving scattering elements, according to some embodiments. That is, for a given intensity of guided polarized light coupled out by a polarization-preserving scattering element, elements with smaller inter-element distance may produce emitted light of higher intensity than elements with larger inter-element distance. Further, in some embodiments, an intensity of the guided polarized light 104 propagated through the light guide 110 decreases with distance from the light source 130. In such embodiments, a spatial density of polarization-preserving scattering elements 120' increases with distance from the light source to compensate for the diminishing intensity in the guided polarized light and couple out light of substantially equal intensity. In embodiments, therefore, the spatial density of the polarization-preserving scattering elements 120' may be varied or modulated to produce a substantially uniform intensity of emitted light across the light guide.

Figure 2A:
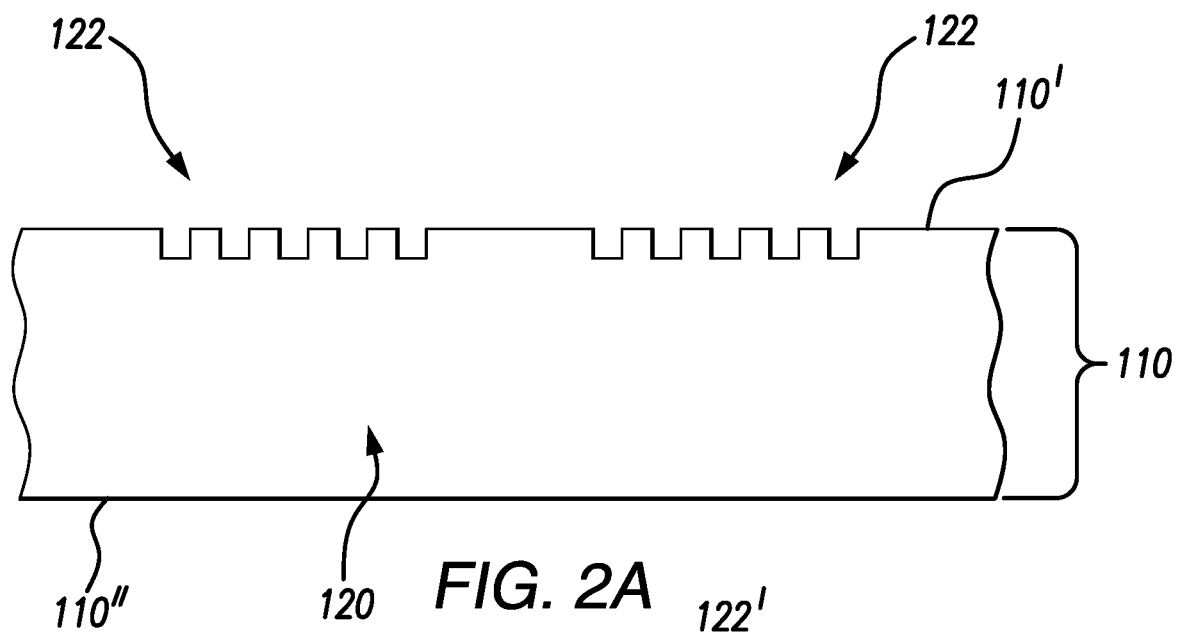
FIG. 2A illustrates a polarization-preserving scattering feature in an example, according to an embodiment consistent with the principles described herein.
Figure 2B:
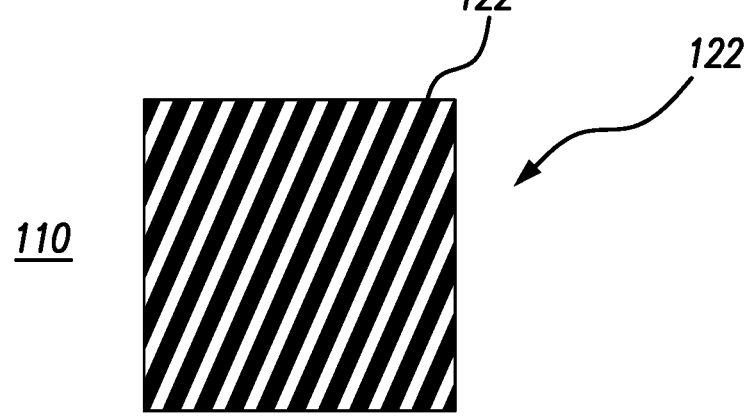
FIG. 2B illustrates a plan view of a diffractive grating in an example, according to an embodiment consistent with the principles described herein.
Figure 2C:
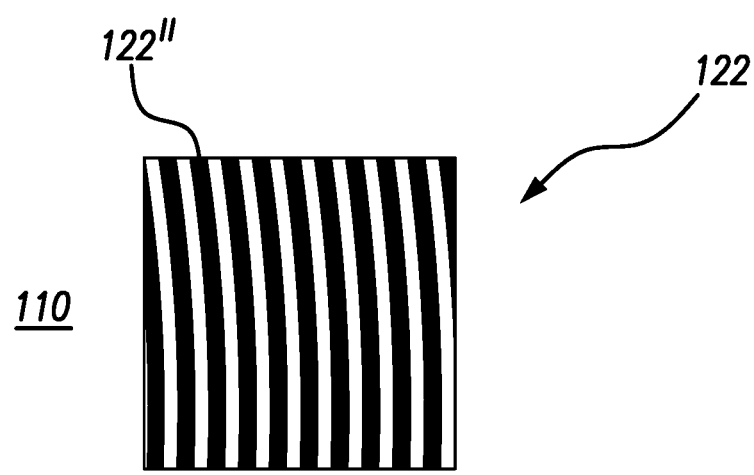
FIG. 2C illustrates a top view of a curved diffraction grating in an example, according to an embodiment consistent with the principles described herein.

Referring to FIGS. 2A-2C, the polarization-preserving scattering elements 120' of the polarization-preserving scattering feature 120 may comprise a diffraction grating 122. The diffraction grating 122 is configured to scatter or couple out a portion of the guided polarized light 104 from the light guide 110 by or using diffractive coupling (also referred to as 'diffractive scattering'), according to various embodiments. The portion of the guided polarized light 104 may be diffractively coupled out by the diffraction grating 122 through the light guide surface (e.g., through the first surface 110' of the light guide 110). Further, the diffraction grating 122 is configured to diffractively couple or scatter out the portion of the guided polarized light 104 as the emitted light 102. The emitted light 102 is directed away from the first surface 110' of the light guide 110, according to various examples. In particular, the coupled-out portion of the guided polarized light 104 is diffractively redirected away from the light guide surface by the diffraction grating 122 as the emitted light 102.

The diffraction grating 122 may be located on either the first surface 110' (e.g., 'front' surface or side) or the second surface 110" (e.g., 'back' surface or side) of the light guide 110. On the first surface 110', the diffraction grating operates in a transmission mode, as described above. That is, the diffraction grating 122 is configured to diffractively redirect guided polarized light 104 that is transmitted or passes through diffraction grating 122 as emitted light. The emitted light 102 is directed away from the first surface 110' of the light guide, as described above. Alternatively, the diffraction grating may be located on the second surface 110" (not illustrated). In this configuration, the diffraction grating operates in a reflection mode. The reflection mode diffractive grating is configured to diffractively redirect guided polarized light 104 into the light guide 110 using reflective diffraction (i.e., reflection and diffraction). The diffractively redirected light is emitted from the first surface 110' as emitted light 102.

According to various embodiments, the diffraction grating 122 comprises a plurality of diffractive features 122' that diffract light (i.e., provide diffraction). The diffraction is responsible for the diffractive coupling of the portion of the guided polarized light 104 out of the light guide 110. For example, the diffraction grating 122 may include one or both of grooves in a surface of the light guide 110 and ridges protruding from the light guide surface that serve as the diffractive features 122'. The grooves and ridges may be arranged parallel or substantially parallel to one another and, at least at some point, perpendicular to a propagation direction of the guided polarized light 104 that is to be coupled out by the diffraction grating 122. As illustrated in FIGS. 2B-2C, a diffraction pattern of the diffraction grating 122 is depicted as alternating black and white bands representing diffractive features of the diffraction grating 122, e.g., one or both of grooves and ridges in a surface of the light guide 110.

In some examples, the diffractive features may be etched, milled or molded into the surface or applied on the surface. As such, a material of the diffraction grating 122 of the polarization-preserving scattering feature 120 may include a material of the light guide 110. As illustrated in FIG. 2A, for example, the diffraction gratings 122 comprise substantially parallel grooves formed in the surface of the light guide 110, by way of example and not limitation. In another example (not illustrated), the diffraction gratings 122 may comprise substantially parallel ridges that protrude from the light guide surface. In yet other examples (also not illustrated), the diffraction gratings 122 may be implemented in or as a film or layer applied or affixed to the light guide surface.

In some embodiments, diffraction grating 122 of the polarization-preserving scattering feature 120 may comprise curved diffractive features 122" or diffractive features arranged to approximate a curve. As illustrated in FIG. 2C, the diffractive features are curved diffractive features, by way of example and not limitation. In particular, as shown in FIG. 2C, concentric black and white curved lines may represent concentric curved diffractive features (e.g., both of concentric curved ridges and concentric curved grooves) on or in the light guide surface. In some embodiments, the curved diffractive features of the diffraction grating 122 may be represented by semicircles (i.e., may be semicircular curved diffractive features), while in other embodiments, another substantially non-circular curve may be employed to realize the curved diffractive features.

Figure 3A:
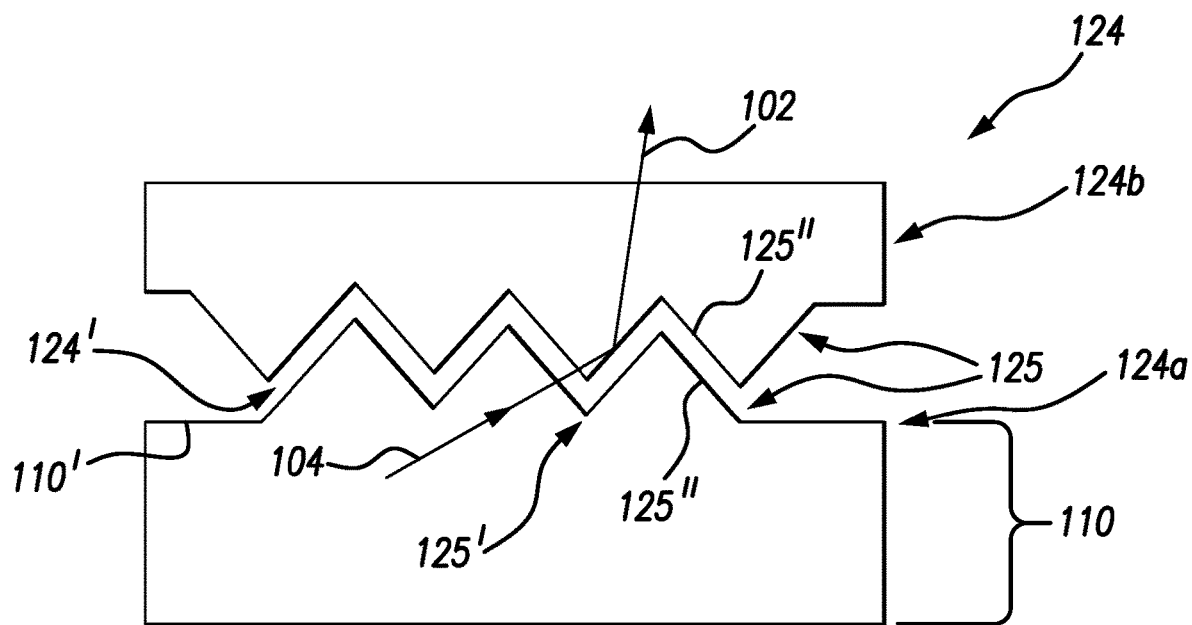
FIG. 3A illustrates a cross-sectional view of a microprism structure comprising microprism layers in an example, according to an embodiment consistent with the principles described herein.

According to various embodiments, the polarization-preserving scattering elements 120' of the polarization-preserving scattering feature 120 may comprise a microprism structure 124, e.g., as illustrated in FIGS. 3A-4B. The microprism structure 124 of FIGS. 3A-3B comprises a plurality of microprisms 125 configured to refractively scatter light incident on the microprism structure 124. As illustrated in FIG. 3A, the microprism structure 124 may be disposed adjacent the light guide 110. In particular, the microprism structure 124 may be in contact with a surface (e.g., the first surface 110') of the light guide 110, in some embodiments. For example, the microprism structure 124 may be partially formed in a surface (e.g., the first surface 110') of the light guide 110, as illustrated in FIG. 3A. The microprism structure 124 is thus configured to refractively scatter out of the light guide 110 a portion of the guided polarized light 104 as the emitted light 102.

In some embodiments, the microprism structure 124 may comprise a first microprism layer and a second microprism layer disposed adjacent to and separated by a gap from the first microprism layer. In other embodiments, the microprism structure may comprise an inverted microprism element. For example, as illustrated in FIG. 3A, the microprism structure 124 comprises a first microprism layer 124a and a second microprism layer 124b. The first microprism layer 124a is configured to refractively couple out of the light guide 110 a portion of the guided polarized light 104. For example, the first microprism layer 124a may locally defeat total internal reflection such that the guide polarized light portion is able to escape or leak out of the light guide 110 (e.g., as illustrated in FIG. 3A by an extended arrow that is depicted exiting the light guide 110 through a surface or facet of the first microprism layer 124a). The refractively coupled-out light is subsequently scattered out as emitted light 102 by the second microprism layer 124b using reflection, as will be described further below.

In various embodiments, the first microprism layer 124a comprises a plurality of substantially parallel elongated ridges or microprisms 125, each microprism 125 being separated from an adjacent microprism 125 by an intervening region or groove 125'. That is, a microprism 125 of the first microprism layer 124a may comprise an elongated microprism 125 situated between two substantially parallel grooves 125'. Thus the first microprism layer 124a comprises a plurality of alternating microprisms 125 and grooves 125'. In some examples, the microprisms 125 may be raised up from or protrude above a surface of the first microprism layer 124a or equivalent the first surface 110' of the light guide 110. Alternatively, a pair of closely-spaced, parallel grooves 125' may be formed or otherwise provided in the surface of the first microprism layer 124a (or the light guide first surface 110') to form a microprism 125 between the grooves 125'.

Figure 3B:
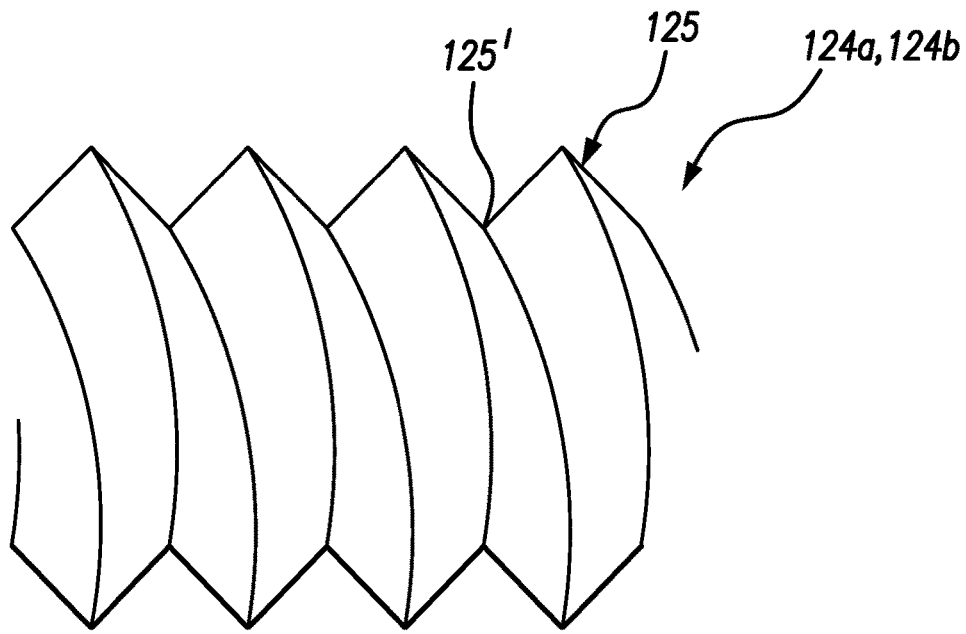
FIG. 3B illustrates a perspective view of a curved microprism layer in an example, according to an embodiment consistent with the principles described herein.

In accordance with various embodiments, a microprism 125 of the first microprism layer 124a may have inclined or sloped sidewalls 125" that join as an apex to form the microprism 125 having a substantially triangular cross-section, as illustrated in FIGS. 3A-3B. That is, the first microprism layer 124a may comprise a microprism 125 having a triangular cross-sectional profile. In other embodiments (not illustrated), the microprism 125 of the first microprism layer 124a may have a sawtooth cross-sectional profile. In yet other embodiments, the microprism 125 of the first microprism layer 124a may have a pyramid structure (not illustrated). The pyramid-shaped microprism 125 may be raised up from a surface of the first microprism layer 124a. In some embodiment, the pyramid may be formed by grooves carved into the surface of the first microprism layer 124a. That is, the microprism 125 of the first microprism layer 124a may be formed by two normally intersecting pairs of closely spaced, substantially parallel grooves having inclined sidewalls. In such embodiments, the first microprism layer 124a thus comprises an array of pyramid microprisms. The microprism layer may comprise an array of microprisms 125 having a variety of other shapes such as, but not limited to, a rectangular, pentagonal, or other polygonal or non-polygonal prism or pyramid.

According to various examples, the first microprism layer 124a is disposed adjacent a surface of the light guide 110. In some embodiments, the first microprism layer 124a may be in contact with the first surface 110' of the light guide 110. In some of these embodiments, the first microprism layer 124a may be integrally formed with or in the surface 110' of the light guide 110, e.g., as shown in FIG. 3A. This is the case in embodiments where the microprisms are formed with grooves 125' provided into the surface of the first microprism layer 124a and therefore of the light guide 110. In such embodiments, the microprisms 125 may comprise a material of the light guide 110. In other embodiments, the first microprism layer 124a may be a layer adjacent or affixed to a surface of the light guide 110. In these embodiments, the microprism 125 or the first microprism layer 124a, as a whole, may also comprise that includes either a material of the light guide 110 or a different material having substantially the same optical properties has the light guide 110. In particular, the first microprism layer 124a and microprisms 125 thereof may comprise material having a dielectric material with the same refractive index as the light guide 110.

According to various embodiments, the microprism structure 124 may comprise a second microprism layer 124b. The second microprism layer 124b is configured to scatter out the refractively coupled out guided light portion provided by the first microprism layer 124a using reflection. The second microprism layer 124b is disposed adjacent the first microprism layer 124a and is separated therefrom by a gap 124', as illustrated in FIG. 3A. In some embodiments, the second microprism layer 124b is disposed on top of first microprism layer 124a and faces the first microprism layer 124a such that the gap 124' is provided between microprisms 125 of the first microprism layer 124a and complementary microprisms 125 of the second microprism layer 124b. In particular, the second microprism layer 124b may be substantially similar to the first microprism layer 124a such that sloped or inclined sidewalls 125" of microprisms 125 of the first and second microprism layers 124a, 124b have complimentary slopes.

According to various embodiments, the inclined sidewalls 125" of the microprisms 125 of the second microprism layer 124b are configured to reflect the refractively coupled-out guided light portion at an interior surface of the inclined sidewalls 125" to provide the emitted light 102, e.g., as illustrated in FIG. 3A. Accordingly, a microprism 125 of the first microprism layer 124a may be disposed inside an intervening region or groove of the second microprism layer 124b or between adjacent microprisms 125 thereof, such that the gap 124' separates respective inclined sidewalls 125" of the microprisms 125 of the first and second microprism layers 124a, 124b.

According to various embodiments, the gap 124' comprises a medium having a dielectric material with a refractive index that is less than a refractive index of the respective first and second microprism layers 124a, 124b. As discussed above, in some embodiments, the first microprism layer 124a and the light guide 110 may comprise the same material or dielectric material having substantially the same refractive index. Accordingly, the gap 124' may comprise a medium having a dielectric material with a refractive index that is lower than a refractive index of the light guide 110 and first microprism layer 124a. For example, the gap 124' between the first and second microprism layers 124a, 124b may comprise air or a similar low refractive index material. The lower refractive index of material within the gap 124' provides a condition for total internal reflection within the light guide and the first microprism layer 124a. Further, the greater refractive index of microprisms 125 in the second microprism layer 124b relative to that of the gap 124' provides an optical boundary between the microprisms 125 thereof and the gap 124' to support total internal reflection of the refractively coupled-out guided light portion at an interior surface of the inclined sidewalls 125", as illustrated in FIG. 3A. In some examples, the gap 124' may extend between an entirety of the opposing surfaces of the first microprism layer 124a and the second microprism layer 124b and further may have a substantially uniform separation or width throughout.

In some embodiments, the first and second microprism layers 124a, 124b may comprise curved microprisms or microprisms arranged to approximate a curve. A plan view in FIG. 3C illustrates curved microprisms 125. As illustrated, the curved microprisms 125 may represent microprisms of the first microprism layer 124a at the surface of the light guide 110. Similarly, the curved microprisms 125 in FIG. 3B may represent microprisms 125 of the second microprism layer 124b that are complementary to the microprisms 125 of the first microprism layer 124a. In particular, as described above, microprisms 125 of the first and second microprism layers 124a, 124b may have inclined sidewalls with complimentary slopes. As a result, in these embodiments, microprisms 125 of the second microprism layer 124b may also be curved. Microprisms 125 of the first or second microprism layers 124a, 124b may have a concentric curve with a center of curvature. In some embodiments, the curved microprisms 125 may be semi-circular, while in other embodiments another substantially non-circular curve may be employed to realize the curved microprisms 125.

Figure 4A:
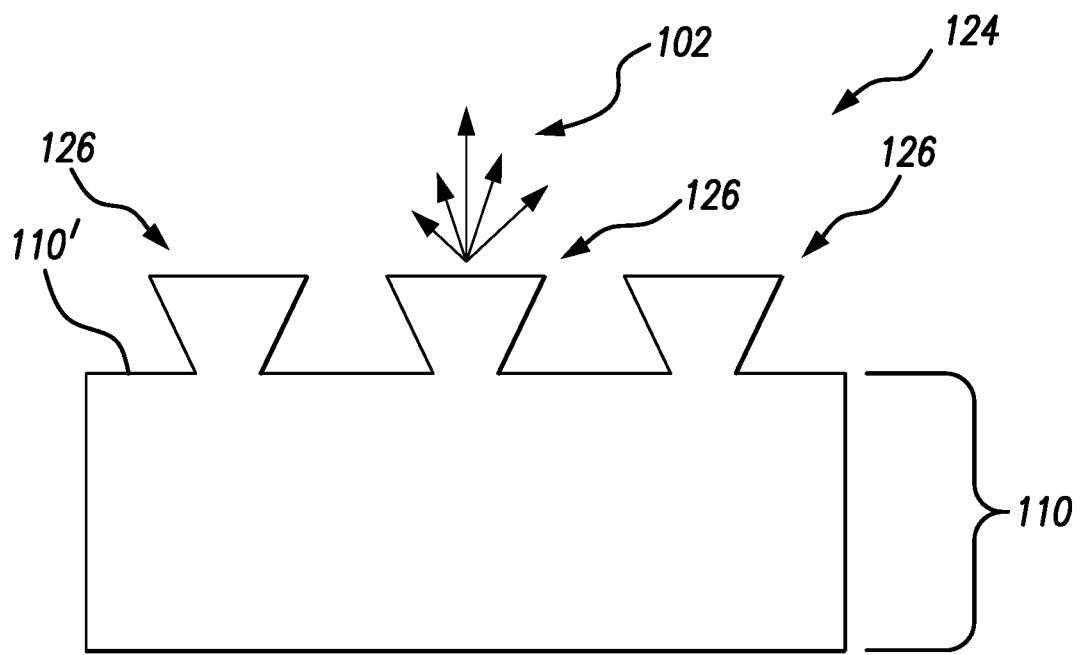
FIG. 4A illustrates a cross-sectional view of a microprism structure comprising inverted microprism elements in an example, according to an embodiment consistent with the principles described herein.
Figure 4B:
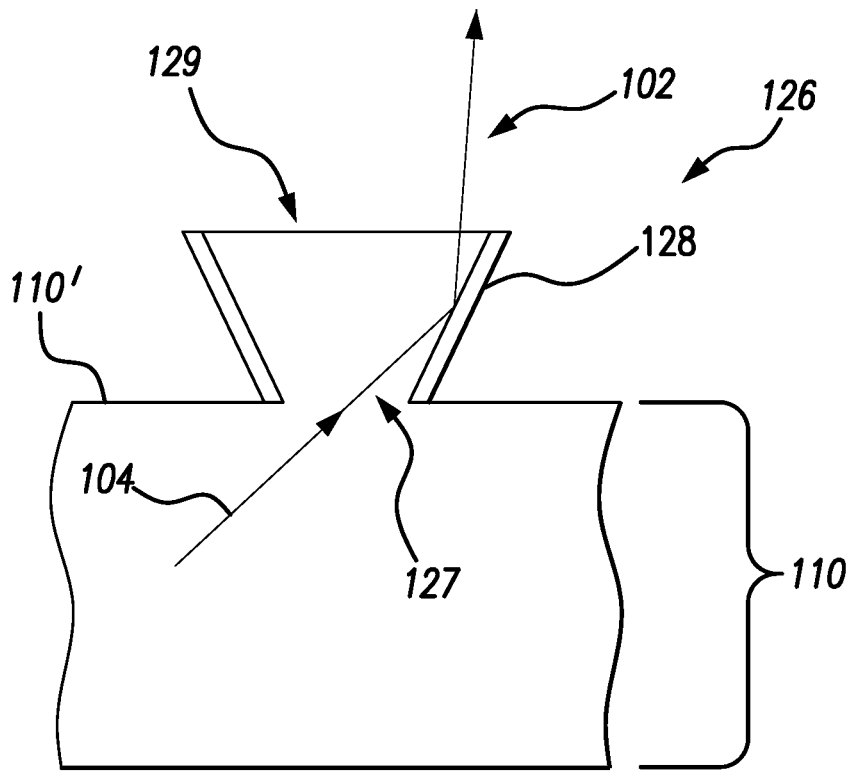
FIG. 4B illustrates a cross-sectional view of an inverted microprism element in an example, according to an embodiment consistent with the principles described herein.

According to the other embodiments, the microprism structure 124 of the polarization-preserving scattering feature 120 may comprise an inverted microprism element. An example of a microprism structure 124 comprising an inverted microprism element 126 is illustrated in FIGS. 4A-4B. As illustrated, the inverted microprism element 126 has a truncated conical shape with an input aperture 127, an inclined sidewall 128, and an output aperture 129. In some embodiments, the microprism structure 124 may comprise a plurality of inverted microprism elements 126, e.g., as illustrated in FIG. 4A.

According to various embodiments, the inverted microprism element 126 is configured to couple out or more generally receive a portion of the guided polarized light 104. In particular, the inverted microprism element 126 is configured to receive the guided polarized light 104 at or through the input aperture 127 and to provide or 'emit' light comprising the guided polarized light reflected by the inclined sidewall(s) 128 of the inverted microprism element at the output aperture 129 as the emitted light 102. In some embodiments, the inverted microprism element 126 may have a shape resembling or substantially similar to a truncated cone, a truncated pyramid, and various other multi-sided structures, according to various embodiments. Further, a specific shape of the inverted microprism element 126 as well as a predetermined slope angle of the inclined sidewalls 128 thereof may be configured to control a shape or an intensity as well as other aspects of the emitted light 102.

In various embodiments, the inverted microprism element 126 may be disposed adjacent to a surface of the light guide 110, e.g., the first surface 110' as illustrated. In some embodiments, the inverted microprism element 126 may extend from and be in direct contact with the first surface 110' of light guide 110. Further, in some embodiments, a material of the inverted microprism element 126 may be substantially similar to a material of the light guide 110. For example, the inverted microprism element 126 may be integral to and comprise a material of the light guide 110. The inverted microprism element 126 may be formed in or from a material (e.g., a surface material) of the light guide 110, for example. In other embodiments, the inverted microprism element 126 may be provided separately from the light guide 110 and then subsequently positioned adjacent or attached thereto to provide contact with the first surface 110' (e.g., top surface) of the light guide 110. In these embodiments, the inverted microprism element 126 may either comprise light guide material or another optical material, for example.

As mentioned above, the inverted microprism element 126 has an input aperture 127. In particular, a portion of the guided polarized light 104 may be extracted or coupled out at an optical connection between the inverted microprism element 126 and the light guide 110. A portion of the inverted microprism element 126 at the optical connection may be referred to as the input aperture 127 of the inverted microprism element 126. The input aperture 127 is thus configured to receive a portion of the extracted or coupled-out portion of the guided polarized light 104.

As is also mentioned above, the inverted microprism element 126 further comprises an inclined sidewall 128, the inclined sidewall 128 having an inclination angle. In various embodiments, the inclined sidewall 128 has an interior surface configured to reflect light. Thus, the inverted microprism element 126 is configured to receive coupled-out polarized light 104 at an input or input aperture 127, and to reflect the received light at an interior surface of the inclined sidewall 128. In some examples, the inclined sidewall 128 of the inverted microprism element 126 may be substantially flat. In other examples, the inclined sidewall 128 may comprise a curve. Some example inverted microprism elements 126 may comprise combinations of flat and curved inclined sidewalls 128. Other varieties of shapes for the inclined sidewall 128 or interior surface thereof may also be used. Further, a specific shape or predetermined slope of the inclined sidewall 128 may be configured to control a shape, intensity, or other aspect of the emitted light 102. In some embodiments, the inclined sidewall 128 may further comprise a reflective layer or reflective material (e.g., a reflective material layer on an exterior surface of the inclined sidewall 128). The reflective layer may be configured to provide or enhance reflection at the interior surface of the inverted microprism element 126. Alternatively, reflection at the interior surface of the inclined sidewalls may be provided by total internal reflection, obviating a need for the reflective layer, in other embodiments.

As mentioned above, the inverted microprism element 126 also has an output or output aperture 129. The output aperture 129 is configured to emit light from the inverted microprism element as the emitted light 102. In particular, the output aperture 129 is configured to provide as the emitted light the guided polarized light 104 received through the input aperture 127 and reflected on the inclined sidewall 128 of the inverted microprism element 126. The output aperture 129 may have any of a variety of different shapes including, but not limited to, a square shape, a circular shape and a triangular shape. An aspect ratio (e.g., a length vs. width) of the output aperture 129 is generally less than about three-to-one (i.e., a length that is less than three times a width), according to various embodiments.

Figure 5:
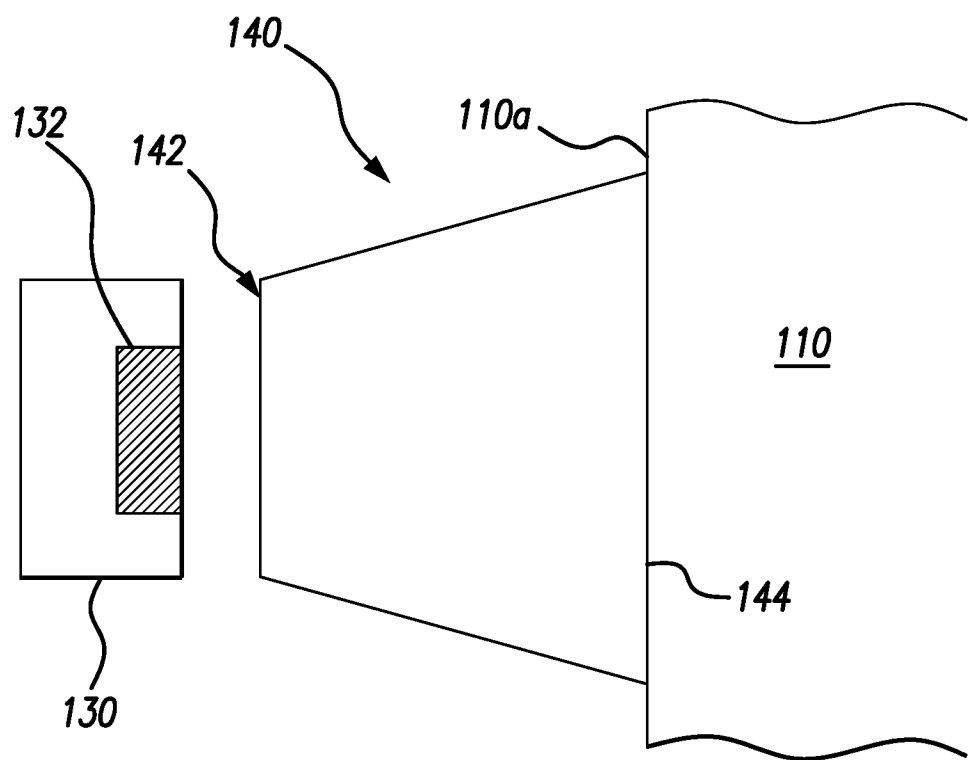
FIG. 5 illustrates a side view of a tapered collimator in an example.

According to some embodiments, the polarized backlight 100 may further comprise a collimator. The collimator may be located between the light source 130 and the light guide 110, for example. In other examples, the light source 130 may comprise the collimator. FIG. 5 illustrates a plan view of a portion of the polarized backlight 100 including a collimator 140 in an example, according to an embodiment consistent with the principles described herein. As illustrated, the collimator 140 is disposed between the light source 130 and the light guide 110 of the polarized backlight 100. According to various embodiments, the collimator 140 is configured to collimate the polarized light generated by the light source 130 to provide collimated polarized light. The collimator 140 is further configured to communicate the collimated polarized light to the light guide 110. In particular, the collimator 140 may be configured to receive substantially uncollimated light from one or more of the optical emitters 132 of the light source 130. The collimator 140 is further configured to convert the substantially uncollimated light into collimated light. The collimator 140 may provide collimated polarized light having the non-zero propagation angle and being collimated according to a predetermined collimation factor σ, according to some embodiments. The collimator is further configured to communicate the collimated polarized light beam to the light guide 110 to propagate as the guided polarized light 104, described above.

In some embodiments (e.g., as illustrated in FIG. 5), the collimator 140 may be a 'tapered' collimator 140. The tapered collimator 140 illustrated in FIG. 5 comprises a light guide having a sidewall taper such that an input end 142 of the tapered collimator 140 is generally narrower than an output end 144 of the tapered collimator 140. In particular, a width dimension of the tapered collimator 140 increases or 'tapers' from the input end 142 to the output end 144 as a result of the sidewall taper. Herein, as illustrated in FIG. 5, the 'width dimension' or simply 'width' is defined as a dimension in a direction corresponding to a width of the light guide 110. The light guide 'width', in turn, is defined as a dimension along or corresponding to a plane that is substantially orthogonal to the general propagation direction the guided polarized light 104. The width of the light guide 110 may also be substantially perpendicular to a height or thickness of the light guide 110, in some embodiments.

According to various embodiments, the input end 142 of the tapered collimator 140 is adjacent to and configured to receive light from the light source, e.g., the light source 130, as illustrated. The light source 130 may be configured to provide substantially uncollimated light, for example. The output end 144 of the tapered collimator 140 is adjacent to and configured to provide the collimated light to the light guide 110 of the polarized backlight 100. As illustrated, collimated light from the tapered collimator 140 is provided at an input or entrance edge 110*a* of the light guide 110.

According the various embodiments, the polarization-preserving scattering feature 120 of the polarized backlight 100 is further configured to provide angle-preserving scattering of the guided polarized light 104. The angle-preserving scattering is configured to preserve a collimation factor σ of the guided polarized light portion in the emitted light 102. That is, the angle-preserving scattering is configured to preserve an angular spread of light incident on the polarization-preserving scattering feature 120 in the emitted light 102. In some embodiments, angle-preserving scattering may be provided by individual discrete structures or features such as the diffraction grating, microprism, or inverted microprism element of the polarization-preserving scattering feature 120, as described above. Further, each discrete structure may be configured to scatter out or couple out a different portion of the guided light in an angle-preserving manner. Thus an angular spread of the emitted light 102 is determined by a characteristic of the angle-preserving scattering of the polarization-preserving scattering feature 120.

In some embodiments, the polarization-preserving scattering feature 120 having angle-preserving scattering is configured to provide emitted light 102 having the angular spread characterized by a predetermined subtended angle γ. The emitted light 102 may thus be substantially confined within the predetermined subtended angle γ or angular spread. Further, the angular spread is a function of the collimation factor of the guided polarized light 104. In particular, the angular spread is proportional to the collimation factor of the guided polarized light 104, according to some embodiments. For example, the predetermined subtended angle γ of the angular spread (or equivalently the 'angular spread') may be given by equation (2) as:

$$\gamma = f(\sigma) \quad (2)$$

where σ is the collimation factor of the guided polarized light 104 and $f(\cdot)$ represents a function such as, but not limited to, a linear function of the collimation factor σ. For example, the function $f(\cdot)$ may be given as γ=a·σ, where a is an integer.

Figure 6A:
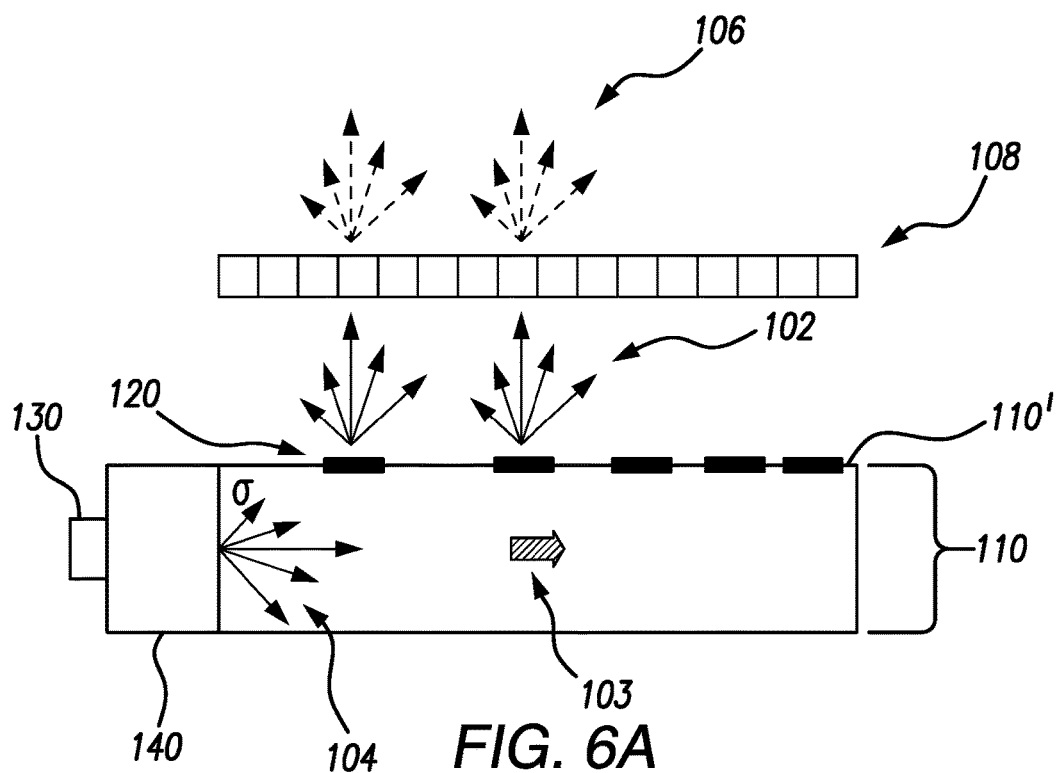
FIG. 6A illustrates a side view of a backlit display with a light valve array in an example, according to an embodiment consistent with the principles described herein.
Figure 6B:
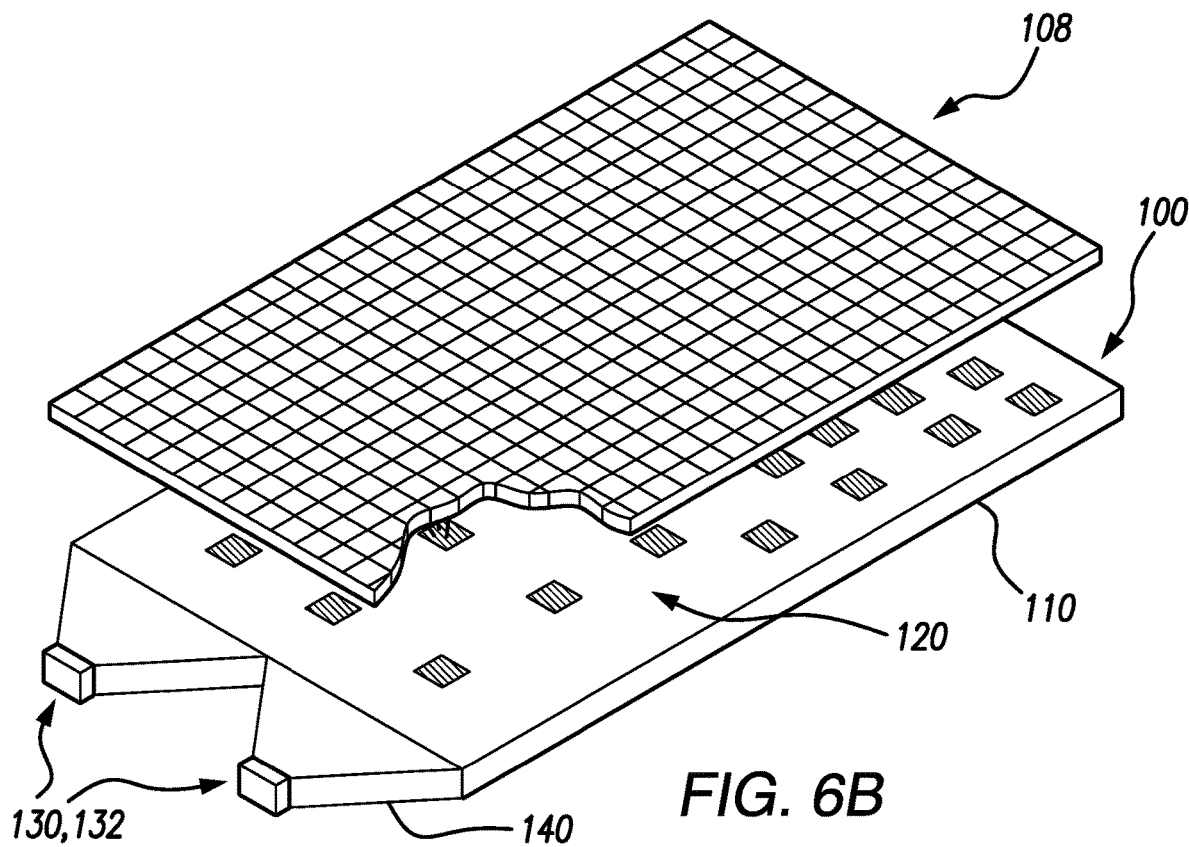
FIG. 6B illustrates a perspective view of a backlit display with a light valve array in an example, according to an embodiment consistent with the principles described herein.

FIGS. 6A-6B further illustrate an array of light valves 108 configured to modulate the emitted light 102. The light valve array may be part of a backlit display that employs the polarized backlight 100, for example, also illustrated in FIGS. 6A-6B for the purpose of facilitating discussion herein. In FIG. 6B, the array of light valves 108 is partially cut away to allow visualization of the light guide 110 and the polarization-preserving scattering feature 120 underlying the light valve array. In various embodiments, different types of light valves may be employed as the light valves 108 of the light valve array including, but not limited to, one or more of liquid crystal light valves, electrophoretic light valves, and light valves based on electrowetting.

The array of light valves 108 is configured to modulate the emitted light 102. In particular, emitted light 102 from the polarization-preserving scattering feature 120 on the light guide 110 may pass through and be modulated by individual light valves 108 of the plurality of light valves or the light valve array. In some embodiments, the emitted light 102 is modulated as pixels of a displayed image. In some embodiments, a polarization of the emitted light 102 is configured to match a polarization of the light valves 108. In particular, the polarization-preserving scattering feature 120 of the polarized backlight 100 used in a backlit display may be configured to couple out of the light guide 110 emitted light 102 that matches a polarization of the light valves 108. Modulated emitted light 106 is illustrated in FIG. 6A as dashed arrows to emphasize modulation thereof.

Figure 7:
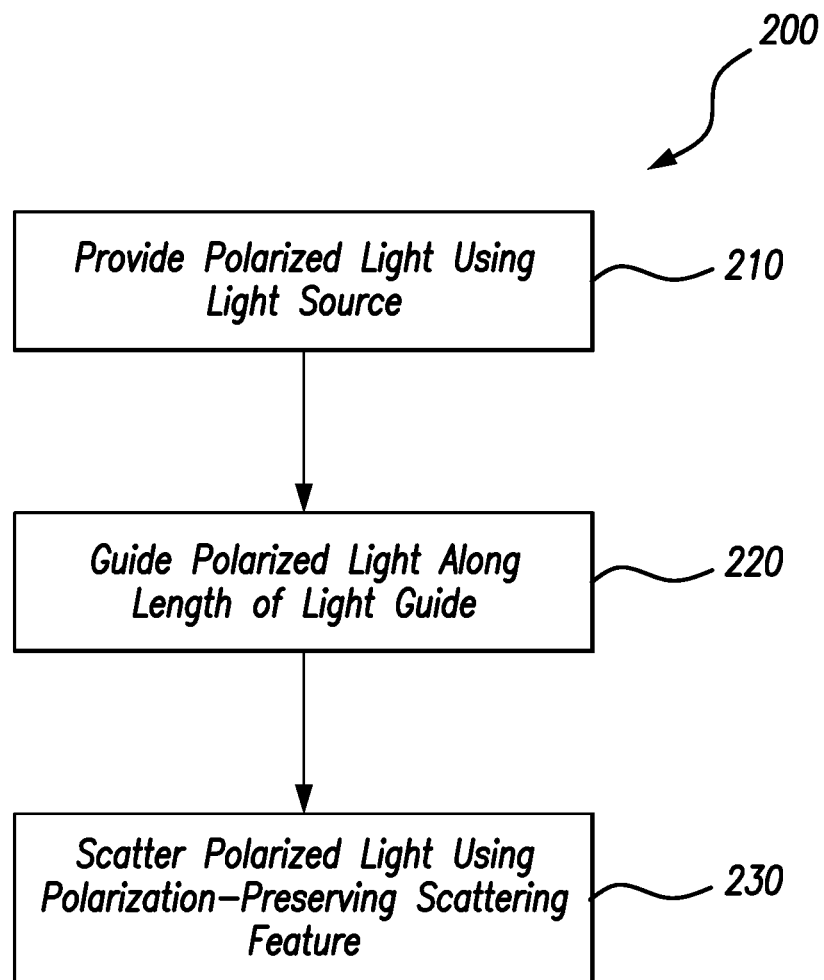
FIG. 7 illustrates a method of operation of a backlit display in an example, according to an embodiment consistent with the principles described herein.

In accordance with other embodiments of the principles described herein, a method for polarized backlight operation is provided. FIG. 7 illustrates a flow chart of a method 200 of polarized backlight operation in an example, according to an embodiment consistent with the principles herein. As illustrated in FIG. 7, the method 200 of polarized backlight operation comprises providing 210 polarized light using a light source. The light source is configured to emit polarized light to be guided within the light guide. That is, the light source is configured to provide light having a predetermined polarization. In some embodiments, the predetermined polarization may be a transverse electric (TE) polarization. Thus, the light provided by the light source may have a transverse electric (TE) polarization component selectively oriented, for example. In other embodiments, the predetermined polarization may be a transverse magnetic (TM) polarization. In some embodiments, the light source may be substantially similar to the light source 130 described above with respect to the polarized backlight 100. For example, the light source may comprise an optical emitter configured to emit polarized light having the predetermined polarization. In other examples, the light source may comprise an optical emitter generating non-polarized light in combination with a polarizer disposed at an output of the optical emitter to provide polarized light.

The method 200 of polarized backlight operation further comprises guiding 220 the polarized light in a propagation direction along a length of a light guide as guided polarized light, as illustrated in FIG. 7. The polarized light may be guided at a non-zero propagation angle using a light guide 110 that is substantially similar as that described above with respect to the polarized backlight 100. The polarized light propagates along the light guide using total internal reflection within the light guide, according to various embodiments.

The method 200 of polarized backlight operation further comprises scattering 230 a portion of the guided polarized light out of the light guide as emitted polarized light using a polarization-preserving scattering feature optically coupled to the light guide. According to various embodiments, the portion of the guided polarized light is scattered 230 out in a manner that substantially preserves in scattered light a degree of polarization of the light incident on the polarization-preserving scattering feature. As such, a polarization of the emitted polarized light is determined by a polarization of the guided polarized light. Further, the polarization-preserving scattering feature may provide angle-preserving scattering, according to some embodiments. In these embodiments, an angular spread of the emitted polarized light is determined by an angular spread or collimation factor of the guided polarized light.

In some embodiments, the polarization-preserving scattering feature employed in scattering 230 a portion of the guided polarized light out of the light guide may be substantially similar to the polarization-preserving scattering feature 120, described above with respect to the polarized backlight 100. For example, the polarization-preserving scattering feature used may comprise various polarization-preserving scattering elements including, but not limited to, a diffraction grating, a microprism structure and an inverted microprism element as well as various combinations thereof that are configured to provide polarization-preserving scattering. In some embodiments, the diffraction grating may be substantially similar to the diffraction grating 122, the microprism structure may be substantially similar to the microprism structure 124, and the inverted microprism may be substantially similar to the inverted microprism 126, also described above with respect to the polarization-preserving scattering feature 120.

In particular, in some embodiments, scattering 230 the guided polarized light portion out of the light guide as emitted polarized light comprises diffractive scattering, the polarization-preserving scattering feature comprising a diffraction grating. In some embodiments, the diffraction grating comprises a plurality of diffraction gratings arranged across a width and along the length of the light guide. In some embodiments, the diffraction grating may comprise curved diffractive features.

In some embodiments, scattering 230 the guided polarized light portion out of the light guide as emitted polarized light comprises refractive scattering, the polarization-preserving scattering feature comprising a microprism structure having an inclined sidewall. In particular, the microprism structure may comprise a microprism or a plurality of microprisms configured to refractively scatter 230 out of the light guide guided polarized light incident on the microprism structure. The microprism structure may comprise a first microprism layer and a second microprism layer, in some embodiments. Microprisms of the first and second microprism layers may have complementary inclined sidewalls, for example. In other embodiments, the microprism structure may comprise an inverted microprism element having a truncated conical shape with an input aperture, an inclined sidewall, and output aperture. In some embodiments, the microprism structure may comprise curved microprisms.

In some embodiments, scattering 230 the guided polarized light portion out of the light guide further comprises controlling an intensity of the emitted polarized light using a spatial density of plurality of polarization-preserving scattering elements of the polarization-preserving scattering feature distributed across a width and a length of the light guide. For example, the spatial density of polarization-preserving scattering elements may be increased as a function of distance from the light source to provide a substantially uniform intensity of the emitted polarized light. That is, the spatial density may compensate for a general decrease in available guided polarized light within the light guide as the distance from the light source increases, for example.

In some embodiments (not illustrated), the method 200 of polarized backlight further comprises collimating the polarized light provided by the light source using a collimator between the light source and the light guide to provide collimated guided polarized light within the light guide. The collimator may comprise a tapered collimator that is substantially similar to the tapered collimator 140 described above with respect to polarized backlight 100, in some embodiments.

In some embodiments, as mentioned above, scattering 230 the guided polarized light portion out of the light guide as emitted polarized light further comprises preserving or substantially preserving a collimation factor of the guided light in the emitted polarized light using the polarization-preserving scattering feature that is also an angle-preserving scattering feature. In particular, the angle-preserving scattering comprises scattering in a manner that substantially preserves in the emitted polarized light a collimation factor of guided polarized light. That is, the angle-preserving scattering may comprise scattering of the guided polarized light in a manner that substantially preserves an angular spread or collimation factor thereof. The angle-preserving scattering may be provided by any of the scattering features described above, including the diffractive gratings and microprism structures, according to various embodiments.

Figure 8:
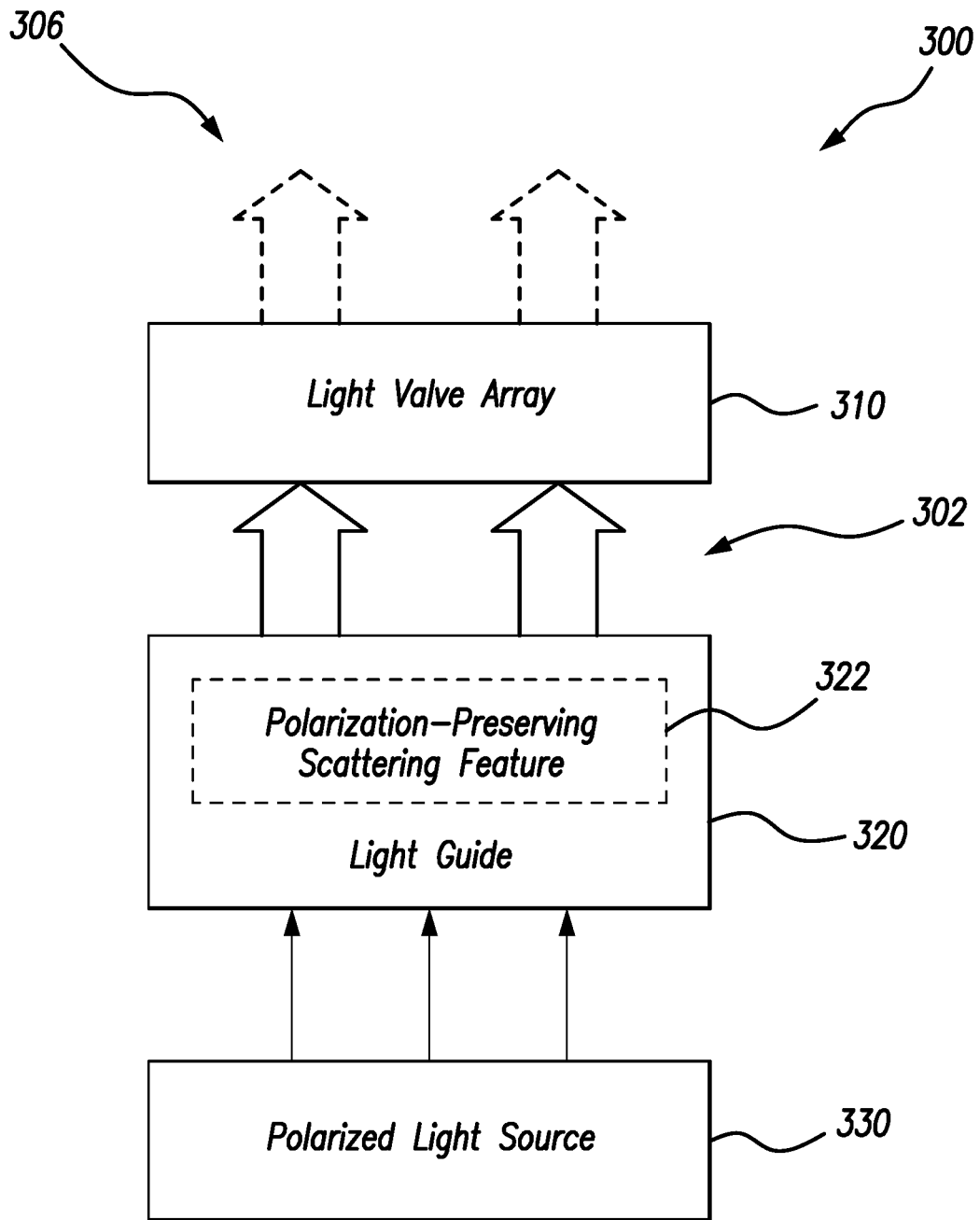
FIG. 8 illustrates a backlit display in an example, according to an embodiment consistent with the principles described herein.

In accordance with some embodiments of the principles described herein, a backlit display 300 is disclosed. FIG. 8 illustrates a block diagram of a backlit display 300 in an example, according to an embodiment consistent with the principles described herein. According to various embodiments, the backlit display 300 employs polarization-preserving scattering to provide emitted polarized light 302 that preserves a polarization of light generated by within the backlit display 300. Further, a polarization of the emitted polarized light 302 is configured to match a polarization of the light valve array used to modulate the emitted polarized light as pixels or modulated polarized light 306 of a displayed image. The backlit display 300 may further employ angle-preserving scattering to preserve a collimation factor of the generated light in the emitted polarized light 302, in some embodiments.

As illustrated in FIG. 8, the backlit display 300 comprises a polarized light source 330 configured to provide polarized light. That is, the light source 330 is configured to provide light having a predetermined polarization. For example, the provided polarized light may comprise a transverse electric (TE) polarization component that is selectively oriented. In some embodiments, the polarized light source 330 may be substantially similar to the light source 130 described above with respect to polarized backlight 100.

The backlit display 300 illustrated in FIG. 8 further comprises a light guide 320 configured to guide the polarized light as guided polarized light. According to various embodiments, the light guide 320 may be configured to guide the polarized light using total internal reflection. Further, the polarized light may be guided at a non-zero propagation angle by or within the light guide 320. In some embodiments, the light guide may be substantially similar to the light guide 110 of the polarized backlight 100, described above. In particular, the light guide 320 may comprise a slab of dielectric material. As such, the light guide 320 may be a plate light guide.

As illustrated, the light guide 320 further comprises a polarization-preserving scattering feature 322 at a surface of the light guide 320. The polarization-preserving scattering feature 322 is configured to scatter a portion of the guided polarized light out of the light guide as emitted polarized light 302. In some embodiments, the polarization-preserving scattering feature 322 of the light guide 320 may be substantially similar to the polarization-preserving scattering feature 120 of the above-described polarized backlight 100. For example, the polarization-preserving scattering feature 322 may comprise various polarization-preserving scattering elements including, but not limited to, a diffraction grating, a microprism structure and an inverted microprism element as well as various combinations thereof that are configured to provide polarization-preserving scattering. In particular, the polarization-preserving scattering feature 322 may comprise one or both of a diffraction grating configured to diffractively scatter the guided polarized light portion out of the light guide 320 and a microprism structure configured to refractively scatter the guided polarized light portion out of the light guide 320. In some embodiments, the diffraction grating may be substantially similar to the diffraction grating 122, while the microprism structure may be substantially similar to either of the microprism structure 124 or the inverted microprism 126, also described above with respect to the polarization-preserving scattering feature 120. In some embodiments, the diffraction grating may comprise curved diffractive features, while the microprism structure may comprise curved microprisms, in some embodiments.

The light guide 320 further comprises a light valve array 310 configured to modulate the emitted polarized light 302 to provide the modulated polarized light 306 representing pixels of a displayed image. In some embodiments, the light valve array 310 may comprise a liquid crystal valve or more particularly a plurality of liquid crystal light valves. Further, according to some embodiments, a polarization of the emitted polarized light 302 may be configured to match a polarization of the light valve array 310.

As mentioned above, in some embodiments, the polarization-preserving scattering feature 322 of the light guide 320 of the backlit display 300 may provide angle-preserving scattering of the guided polarized light. For example, the angle-preserving scattering may be provided by the diffraction grating or microprism structures as described above with respect to the polarized backlight 100. The angle-preserving scattering may preserve a collimation factor of the guided polarized light in the emitted polarized light 302, in some embodiments.

Thus, there have been described examples and embodiments of a polarized backlight, a method of backlight operation, and a backlit display that employ polarization-preserving scattering features to couple out guided polarized light as emitted polarized light. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A polarized backlight comprising:
a light source configured to provide polarized light;
a light guide configured to guide the polarized light in a propagation direction along a length of the light guide as guided polarized light; and
a polarization-preserving scattering feature optically coupled to the light guide, the polarization-preserving scattering feature being configured to scatter a portion of the guided polarized light out of the light guide as emitted polarized light,
wherein a polarization of the emitted polarized light is determined by a polarization of the guided polarized light, and wherein the polarization-preserving scattering feature is further configured to provide angle-preserving scattering of the guided polarized light portion, the angle-preserving scattering being configured to preserve a collimation factor of the guided polarized light portion in the emitted polarized light.

2. The polarized backlight of claim 1, wherein the polarization-preserving scattering feature comprises a plurality of polarization-preserving scattering elements spaced apart from one another across a width and along the length of the light guide, the plurality of polarization-preserving scattering elements being configured to scatter out of the light guide a portion of the guided polarized light as the emitted polarized light.

3. The polarized backlight of claim 2, wherein a spatial density of the polarization-preserving scattering elements within the polarization-preserving scattering feature is configured to control an intensity of the emitted polarized light, the spatial density being a function of distance from the light source.

4. The polarized backlight of claim 2, wherein the plurality of polarization-preserving scattering elements comprises at least one of a diffraction grating and a microprism structure.

5. The polarized backlight of claim 1, wherein the polarization-preserving scattering feature comprises a diffraction grating configured to diffractively scatter out of the light guide a portion of the guided polarized light as the emitted polarized light.

6. The polarized backlight of claim 5, wherein the diffraction grating comprises curved diffractive features.

7. The polarized backlight of claim 1, wherein the polarization-preserving scattering feature comprises a microprism structure configured to refractively scatter out of the light guide a portion of the guided polarized light as the emitted polarized light.

8. The polarized backlight of claim 7, wherein the microprism structure comprising a first microprism layer and a second microprism layer disposed adjacent to and separated by a gap from the first microprism layer, microprisms of the first and second microprism layers having inclined sidewalls with complementary slopes, and wherein the inclined sidewalls of the microprisms of the second microprism layer are configured to reflect the portion of the guided polarized light refractively scattered out of the light guide at an interior surface of the sidewalls to provide the emitted polarized light.

9. The polarized backlight of claim 8, wherein the first and second microprism layers comprise curved microprisms.

10. The polarized backlight of claim 7, wherein the microprism structure comprises an inverted microprism element having a truncated conical shape with an input aperture, an inclined sidewall, and an output aperture, the input aperture being configured to receive the guided polarized light portion refractively scattered out of the light guide, the inclined sidewall being configured to reflect as reflected polarized light the guided polarized light portion received through the input aperture, and the output aperture being configured to emit the reflected polarized light as the emitted polarized light.

11. The polarized backlight of claim 1, further comprising a collimator between the light source and the light guide, the collimator configured to collimate the polarized light generated by the light source as collimated polarized light and to communicate the collimated polarized light to the light guide.

12. A backlit display comprising the polarized backlight of claim 1, the backlight display further comprising an array of light valves configured to modulate the emitted polarized light and display an image, wherein the array of light valves comprises liquid crystal light valves and the polarization of the emitted polarized light is configured to match a polarization of the liquid crystal light valves.

13. A method for polarized backlight operation, the method comprising:
provide polarized light using a light source;
guiding the polarized light in a propagation direction along a length of a light guide as guided polarized light; and
scattering a portion of the guided polarized light out of the light guide as emitted polarized light using a polarization-preserving scattering feature optically coupled to the light guide, scattering comprising controlling an intensity of the emitted polarized light using a spatial density of a plurality of polarization-preserving scattering elements of the polarization-preserving scattering feature, the spatial density of the polarization-preserving scattering elements being a function of distance from the light source,
wherein a polarization of the emitted polarized light is determined by a polarization of the guided polarized light.

14. The method of polarized backlight operation of claim 13, wherein the plurality of polarization-preserving scattering elements of the polarization-preserving scattering feature are distributed across a width and along the length of the light guide.

15. The method of polarized backlight operation of claim 13, wherein scattering the guided polarized light portion out of the light guide as emitted polarized light comprises diffractive scattering, the polarization-preserving scattering feature comprising a diffraction grating.

16. The method of polarized backlight operation of claim 15, wherein the diffraction grating comprises a plurality of diffraction gratings arranged across a width and along the length of the light guide.

17. The method of polarized backlight operation of claim 13, wherein scattering the guided polarized light portion out of the light guide as emitted polarized light comprises refractive scattering, the polarization-preserving scattering feature comprising a microprism structure having an inclined sidewall.

18. The method of polarized backlight operation of claim 13, further comprising collimating the polarized light provided by the light source using a collimator between the light source and the light guide to provide collimated guided polarized light within the light guide, wherein scattering the guided polarized light portion out of the light guide as emitted polarized light further comprises preserving a collimation factor of the guided light in the emitted polarized light using the polarization-preserving scattering feature that is also an angle-preserving scattering feature.

19. A backlit display comprising:
a polarized light source configured to provide polarized light;
a light guide configured to guide the polarized light as guided polarized light and having a polarization-preserving scattering feature at a surface of the light guide, the polarization-preserving scattering feature being configured to scatter a portion of the guided polarized light out of the light guide as emitted polarized light; and
a light valve array configured to modulate the emitted polarized light to provide modulated polarized light representing pixels of a displayed image,
wherein a polarization of the emitted polarized light is configured to match a polarization of the light valve array.

20. The backlit display of claim 19, wherein the polarization-preserving scattering feature comprises one or both of a diffraction grating configured to diffractively scatter the guided polarized light portion out of the light guide and a microprism structure configured to refractively scatter the guided polarized light portion out of the light guide.

21. The backlit display of claim 19, wherein the light valve array comprises a liquid crystal light valve.

22. The backlit display of claim 19, wherein the polarization-preserving scattering feature is further configured to provide angle-preserving scattering of the guided polarized light portion, the angle-preserving scattering being configured to preserve a collimation factor of the guided polarized light portion in the emitted polarized light.

23. The backlit display of claim 19, wherein the polarization-preserving scattering feature comprises a plurality of polarization-preserving scattering elements spaced apart from one another across a width and along the length of the light guide, a spatial density of the polarization-preserving scattering elements within the plurality of polarization-preserving scattering elements being configured to control an intensity of the emitted polarized light.

* * * * *